United States Patent
Matsumoto et al.

(10) Patent No.: US 9,859,720 B2
(45) Date of Patent: Jan. 2, 2018

(54) POWER TRANSMISSION DEVICE AND WIRELESS POWER TRANSMISSION SYSTEM

(71) Applicant: Panasonic Corporation, Osaka (JP)

(72) Inventors: Hiromu Matsumoto, Osaka (JP); Hiroshi Kanno, Osaka (JP); Hiroshi Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 134 days.

(21) Appl. No.: 14/937,852

(22) Filed: Nov. 10, 2015

(65) Prior Publication Data
US 2016/0064952 A1 Mar. 3, 2016

Related U.S. Application Data

(63) Continuation of application No. PCT/JP2014/003637, filed on Jul. 9, 2014.

(30) Foreign Application Priority Data

Jul. 31, 2013 (JP) .................................. 2013-159344

(51) Int. Cl.
*G06F 7/44* (2006.01)
*G06G 7/12* (2006.01)
(Continued)

(52) U.S. Cl.
CPC .............. *H02J 5/005* (2013.01); *H01F 38/14* (2013.01); *H02J 7/025* (2013.01); *H02J 17/00* (2013.01);
(Continued)

(58) Field of Classification Search
CPC .. H02J 5/005; H02J 50/90; H02J 50/10; H02J 50/60; H02J 7/025; H02J 17/00; H01J 38/14; H01F 27/365
(Continued)

(56) References Cited

U.S. PATENT DOCUMENTS 9,325,187 B2 * 4/2016 Lee ........................ H02J 7/0052
9,360,508 B2 * 6/2016 Bunsen ................... G01R 27/04
(Continued)

FOREIGN PATENT DOCUMENTS

JP 9-019078 A 1/1997
JP 2006-060909 3/2006
(Continued)

OTHER PUBLICATIONS

International Search Report of PCT application No. PCT/JP2014/003637 dated Aug. 12, 2014.

*Primary Examiner* — Dinh T Le
(74) *Attorney, Agent, or Firm* — Renner, Otto, Boisselle & Sklar, LLP

(57) ABSTRACT

In a power transmission device including a power transmission coil that is disposed to oppose an installation surface of the power transmission device on which a power receiving device is installed and that is capable of being electromagnetically coupled with the power receiving coil. A magnetic substance is disposed at least outside the power transmission coil to oppose the installation surface via the power transmission coil and to be electromagnetically coupled with the power transmission coil. A object detecting circuit detects a metal object existing at least outside the power transmission coil by supplying first AC power to the power transmission coil and detecting a change in at least one of a voltage, a current, and a frequency of the first AC power or a voltage or current of a DC component of the first AC power.

7 Claims, 15 Drawing Sheets

(51) Int. Cl.
  *H02J 5/00*   (2016.01)
  *H02J 50/70*  (2016.01)
  *H02J 50/40*  (2016.01)
  *H02J 50/12*  (2016.01)
  *H01F 38/14*  (2006.01)
  *H02J 17/00*  (2006.01)
  *H02J 7/02*   (2016.01)
  *H02J 50/10*  (2016.01)
  *H02J 50/90*  (2016.01)
  *H02J 50/60*  (2016.01)
  *H01F 27/36*  (2006.01)

(52) U.S. Cl.
  CPC .............. *H02J 50/10* (2016.02); *H02J 50/12* (2016.02); *H02J 50/40* (2016.02); *H02J 50/60* (2016.02); *H02J 50/70* (2016.02); *H02J 50/90* (2016.02); *H01F 27/365* (2013.01)

(58) Field of Classification Search
  USPC ........................................................ 307/104
  See application file for complete search history.

(56) References Cited

U.S. PATENT DOCUMENTS

| | | | |
|---|---|---|---|
| 9,518,948 B2* | 12/2016 | Miyamoto | G01V 3/10 |
| 9,612,352 B2* | 4/2017 | Alshuhail | G01V 1/48 |
| 2010/0013322 A1 | 1/2010 | Sogabe et al. | |
| 2010/0123430 A1 | 5/2010 | Kojima et al. | |
| 2013/0093257 A1 | 4/2013 | Goto | |
| 2014/0239735 A1 | 8/2014 | Abe et al. | |
| 2015/0349542 A1* | 12/2015 | Yamamoto | G01V 3/10 |
| | | | 307/104 |

FOREIGN PATENT DOCUMENTS

| | | |
|---|---|---|
| JP | 2010-028935 | 2/2010 |
| JP | 2010-119251 | 5/2010 |
| JP | 2013-046526 | 3/2013 |
| JP | 2013-135523 A | 7/2013 |
| WO | 2013/035853 | 3/2013 |

* cited by examiner

POWER TRANSMISSION DEVICE AND WIRELESS POWER TRANSMISSION SYSTEM

BACKGROUND

1. Technical Field

The present disclosure relates to a power transmission device and a wireless power transmission system that wirelessly transmit electric power using electromagnetic induction between a power transmission coil and a power receiving coil.

2. Description of the Related Art

In recent years, a portable telephone device and other various kinds of mobile devices have become popular. In such mobile devices, an improvement in functionality and performance has been made and it has become possible to treat a wide variety of contents, and accordingly mobile devices need increasingly large power consumption. In a mobile device that operates with a battery with a predetermined capacity, if the power consumption thereof increases, the allowed operation time thereof decreases. A wireless power transmission system is attracting much attention as a technique to compensate for the limitation on the capacity of the battery. In the wireless power transmission system, electric power is transmitted wirelessly from a power transmission device to a power receiving device using electromagnetic induction between a power transmission coil of the power transmission device and a power receiving coil of the power receiving device. In particular, a wireless power transmission system using a resonant power transmission coil and a resonant power receiving coil is capable of maintaining a high transmission efficiency even when there is some deviation in relative position between the transmission coil and the power receiving coil, and thus this type of wireless power transmission system is expected to be used in various applications (for example, see Japanese Unexamined Patent Application Publication No. 2006-60909).

SUMMARY

In the conventional technique described above, there is a need for a technique to prevent a metal object located apart from the power transmission coil from being heated.

In one general aspect, the techniques disclosed here feature that a power transmission device wirelessly transmits electric power to a power receiving device including a power receiving coil, and the power transmission device includes: a power transmission coil that is disposed to oppose an installation surface of the power transmission device on which the power receiving device is installed and that is capable of being electromagnetically coupled with the power receiving coil; a magnetic substance that is disposed at least outside the power transmission coil to oppose the installation surface via the power transmission coil and that is electromagnetically coupled with the power transmission coil; and a object detecting circuit that detects a metal object existing at least outside the power transmission coil by supplying first AC power to the power transmission coil and detecting a change in at least one of a voltage of the first AC power, a current of the first AC power, a frequency of the first AC power, a voltage of a DC component of the first AC power, and a current of the DC component of the first AC power.

The power transmission device in one general aspect is capable of preventing the metal object located apart from the power transmission coil from being heated.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
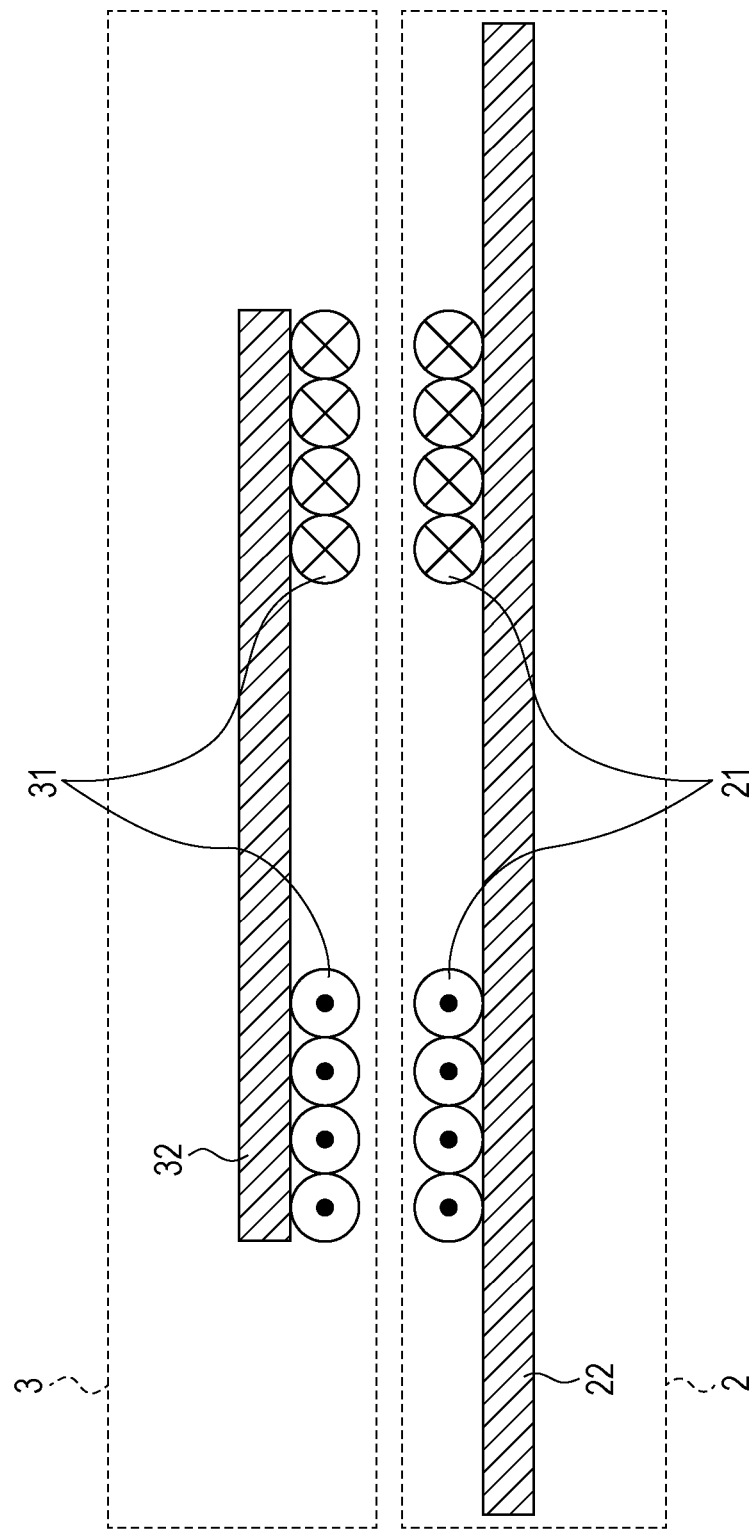
FIG. 1 is a cross-sectional view illustrating a structure of a wireless power transmission system according to a first embodiment.

Underlying Knowledge Forming Basis of the Present Disclosure

The present inventors have found that the wireless power transmission system described above in Section "2. Description of the Related Art" has problems described below.

In a wireless power transmission system, when there is a metal object between a power transmission coil and a power receiving coil, there is a possibility that heating occurs due to an induced current (an eddy current) caused by a magnetic field generated by the power transmission coil or the power receiving coil. The width of a region in which the magnetic field is generated is similar to the width of the power transmission coil or the power receiving coil.

In Japanese Unexamined Patent Application Publication No. 2006-60909, a change in voltage of the power transmission coil is detected in a state in which electric power is being supplied from the power transmission device to the power receiving device after the positioning between the power transmission device and the power receiving device is completed. If a change in voltage is found in the detection process, it is determined that existence of a metal object is detected, and a lamp is turned on to give a notification to a user.

In the technique disclosed in Japanese Unexamined Patent Application Publication No. 2006-60909, it is possible to detect a metal object when the metal object is located between the power transmission coil and the power receiving coil. However, the inventors have found that it is impossible to detect a metal object when the metal object is located apart from the power transmission coil as will be described in detail below.

In a case where electric power is being supplied from the power transmission device to the power receiving device in a state in which there is a deviation in relative position between the power transmission coil and the power receiving coil, a metal object located apart from the power transmission coil is not electromagnetically coupled with the power transmission coil, but it may be electromagnetically coupled with the power receiving coil. In this case, there is a possibility that the metal object is heated by an induced current caused by a magnetic field generated by the power receiving coil. In the technique disclosed in Japanese Unexamined Patent Application Publication No. 2006-60909, as described above, when the power transmission coil and the power receiving coil are electromagnetically coupled, the width of the region of the magnetic field generated by the power transmission coil and that from the power receiving coil are substantially equal to the width of the power transmission coil or the width of the power receiving coil. Therefore, in the technique disclosed in Japanese Unexamined Patent Application Publication No. 2006-60909, in a situation in which the power receiving coil is electromagnetically coupled with the power transmission coil, and the power receiving coil is deviated in position from the power transmission coil, the magnetic field is weak in a region outside the power transmission coil, and thus the power transmission device is not capable of detecting a metal object coming to a location close to only the power receiving coil while being apart from the power transmission coil.

Thus, in the wireless power transmission system, there is a need for a technique of detecting not only a metal object located close to the power transmission coil but also a metal object coming to a location close to only the power receiving coil while being apart from the power transmission coil in a situation in which the power receiving coil is electromagnetically coupled with the power transmission coil, and the power receiving coil is deviated in position from the power transmission coil.

Through the investigation described above, the inventors have achieved various aspects disclosed herein.

In an aspect of the present disclosure, a power transmission device wirelessly transmits electric power to a power receiving device including a power receiving coil, and the power transmission device includes: a power transmission coil that is disposed to oppose an installation surface of the power transmission device on which the power receiving device is installed and that is capable of being electromagnetically coupled with the power receiving coil; a magnetic substance that is disposed at least outside the power transmission coil to oppose the installation surface via the power transmission coil and that is electromagnetically coupled with the power transmission coil; and a object detecting circuit that detects a metal object existing at least outside the power transmission coil by supplying first AC power to the power transmission coil and detecting a change in at least one of a voltage of the first AC power, a current of the first AC power, a frequency of the first AC power, a voltage of a DC component of the first AC power, and a current of the DC component of the first AC power.

In this aspect, the magnetic substance is disposed at least outside the power transmission coil to oppose the installation surface via the power transmission coil such that the magnetic substance is electromagnetically coupled with the power transmission coil. This makes it possible to generate a magnetic field over a great region including the region of the magnetic substance. Therefore, in a situation in which the power receiving coil and the power transmission coil are electromagnetically coupled with each other although there is a deviation in relative position between the power receiving coil and the power transmission coil, it is possible to detect not only a metal object located close to the power transmission coil but also a metal object located close to only the power receiving coil but located apart from the power transmission coil.

By performing the metal object detection before supplying of electric power from the power transmission device to the power receiving device is started, it becomes possible to prevent heating of a metal object from occurring.

By performing the detection using weak electric power (hereinafter referred to as first AC power) smaller than electric power supplied from the power transmission device to the power receiving device (hereinafter referred to as second AC power), it becomes possible to prevent an eddy current from occurring in the metal object and thus it is possible to prevent the metal object from being heated even if the metal object exists.

A wireless power transmission system according to embodiments of the present disclosure is described below with reference to drawings.

FIG. 1 is a cross-sectional view illustrating a configuration of a wireless power transmission system according to a first embodiment. The wireless power transmission system includes a power transmission device 2 and a power receiving device 3. In this wireless power transmission system, electric power is wirelessly transmitted from the power transmission device 2 to the power receiving device 3.

As illustrated in FIG. 1, the power transmission device 2 includes a power transmission coil 21 and a magnetic substance 22, and the power receiving device 3 includes a power receiving coil 31 and a magnetic substance 32. When the power receiving device 3 is positioned to oppose the power transmission device 2, the power receiving coil 31 is capable of being electromagnetically coupled with the power transmission coil 21. In general, the power receiving device 3 is put on an installation surface of the power transmission device 2 on which the power receiving device 3 is supposed to be installed.

Figure 2:
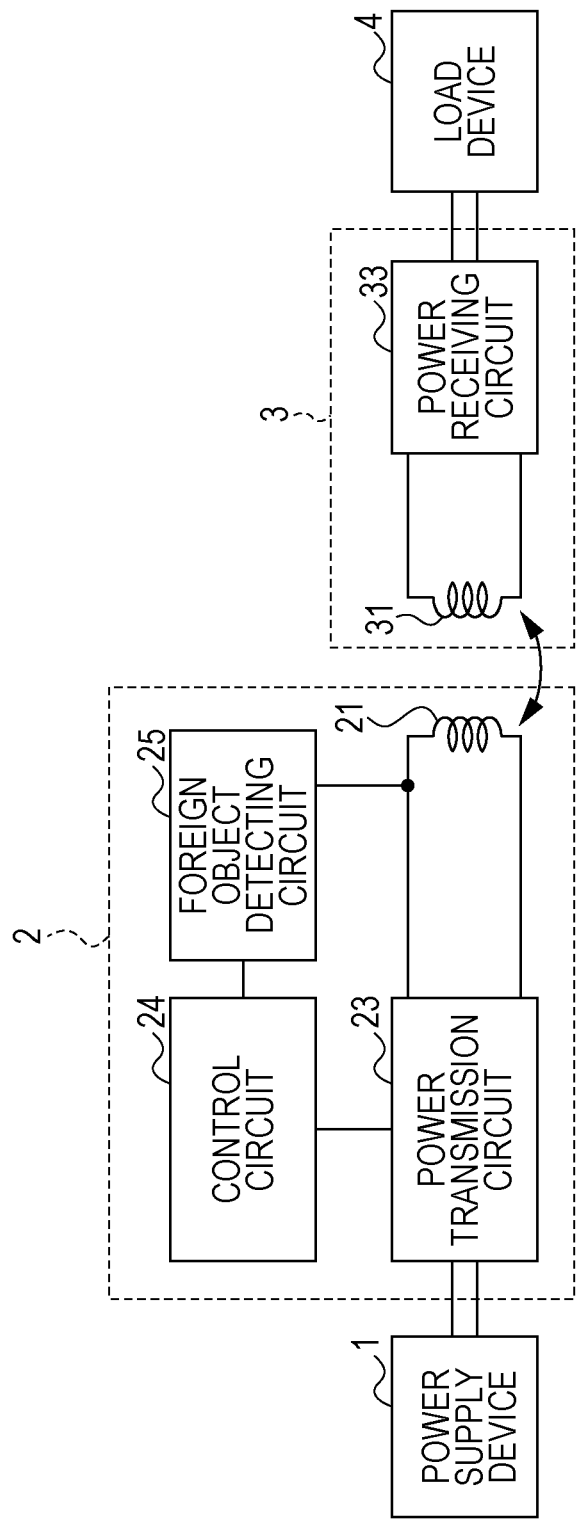
FIG. 2 is a block diagram illustrating a configuration of the wireless power transmission system in FIG. 1.

FIG. 2 is a block diagram illustrating a configuration of the wireless power transmission system in FIG. 1. As illustrated in FIG. 2, the power transmission device 2 is connected to a power supply device 1, and the power receiving device 3 is connected to a load apparatus 4. The power transmission device 2 further includes a power transmission circuit 23, a control circuit 24, and a object detecting circuit 25. The power transmission circuit 23 receives DC or AC power supplied from the power supply device 1, and the power transmission circuit 23 supplies AC power to the power transmission coil 21.

The object detecting circuit 25 detects a metal object located close to the power transmission coil by detecting a change at least in one of following parameters, that is, a voltage, a current, and a frequency of the AC power in the power transmission coil 21, a voltage of a DC component, and a current of the DC component.

Note that the object detecting circuit 25 may use two types of AC power in the object detection process, as described below. In a first case, an oscillation circuit described later is provided to transmit first AC power to the power transmission coil 21, and a change is detected in at least one of following parameter values, that is, a voltage, a current, and a frequency of the first AC power, a voltage of a DC component, and a current of the DC component. In general, the first AC power transmitted to the power transmission coil is set to be smaller than the second AC power transmitted to the power transmission coil. That is, the object detecting circuit 25 supplies first AC power smaller, that is, weaker than the second AC power to the power transmission coil. This allows the object detecting circuit to detect a metal object by using the weak first AC power, not during the period in which the second AC power is supplied, but before starting supplying the second AC power. Thus, even if there is a metal object, it is possible to prevent an eddy current from occurring in the metal object and thus it is possible to prevent the metal object from being heated.

In a second case, a detection is performed on a change in at least one of parameter values, that is, a voltage, a current, and a frequency of second AC power supplied from the power transmission circuit 23 to the power transmission coil 21, a voltage of a DC component of the second AC power, and a current of the DC component of the second AC power.

In this case, the object detecting circuit detects a object by using second AC power supplied from the power transmission circuit to the power transmission coil. That is, the metal object detection is performed during a period in which electric power is being supplied to the power receiving device. Thus, when a metal object is detected when electric power is being transmitted to the power receiving device, heating of the metal object is prevented.

Next, a description is given below as to heating of a metal object existing outside the power transmission coil 21.

Figure 4:
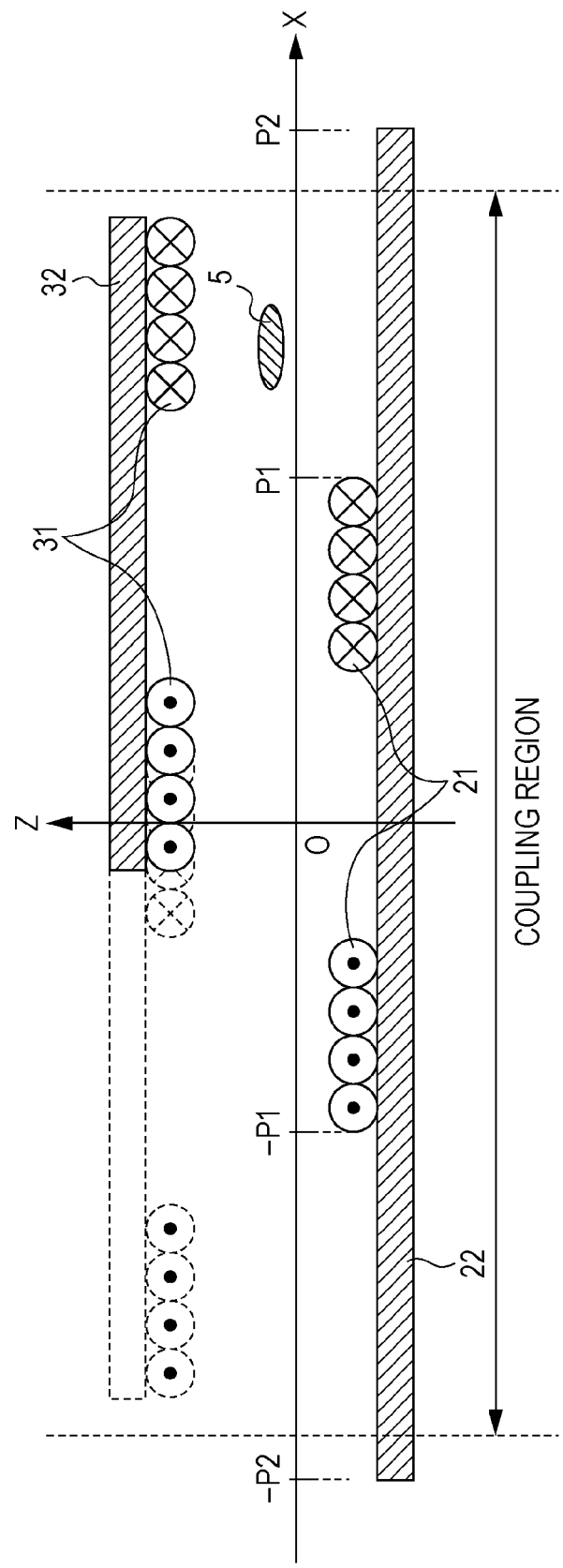
FIG. 4 is a cross-sectional view illustrating a situation in which there is some deviation in relative position between a power transmission coil and a power receiving coil in FIG. 1.

For example, as illustrated in FIG. 4, there can be a case in which electric power is being supplied from the power transmission device to the power receiving device in a state in which there is a deviation in relative position between the power transmission coil 21 and the power receiving coil 31. In this case, there is a possibility that if there is a metal object that is not electrically coupled with the power transmission coil 21, from which the metal object is located away, but electrically coupled with only the power receiving coil 31, the metal object is heated by an induced current induced by a magnetic field generated by the power receiving coil 31. Heating of a metal object by a magnetic field generated by the power receiving coil 31 may also occur in a situation in which the metal object is located away from the power transmission coil 21.

Herein, a coupling region is defined as follows. When a region in which a metal object is heated is projected onto an X axis (in parallel to the magnetic substance) shown in FIG. 4, a resultant region on the X axis is called the coupling region. For example, as illustrated in FIG. 4, the magnetic substance 22 may be disposed somewhere within the coupling region. The magnetic substance 22 is disposed over the coupling region to cover a region in which the power transmission coil 21 has no winding in the coupling region and to be electromagnetically coupled with the power transmission coil 21. Furthermore, the magnetic substance 22 is disposed such that the magnetic substance 22 is located at least in a region outside the power transmission coil 21 as illustrated in FIG. 1. The magnetic substance 22 may be located also inside the outer circumference of the power transmission coil 21. At least part of the winding of the power receiving coil 31 is wound along a surface, of the power receiving device 3, opposing the power transmission device 2.

When the control circuit 24 detects a object located close to the coupling region by using the object detecting circuit 25, the control circuit 24 stops supplying AC power from the power transmission circuit 23 to the power transmission coil 21. The power receiving device 3 further includes a power receiving circuit 33 that rectifies and smooths AC power received from the power transmission device 2 via the power receiving coil 31 and supplies the resultant electric power to the load apparatus 4. The load apparatus 4 includes a battery to be charged or another circuit that consumes electric power. Note that a DC/DC converter may be further provided between the power receiving circuit 33 and the load apparatus 4. This makes it possible to supply electric power with a constant voltage to the load apparatus 4 regardless of the coupling coefficient between the power transmission coil 21 and the power receiving coil 31 or regardless of the impedance of the load apparatus 4. In FIG. 1, for simplification of illustration, the power transmission circuit 23, the control circuit 24, the object detecting circuit 25, and the power receiving circuit 33 are not shown, and the magnetic substance 22 and 32 are not shown in FIG. 2.

The power transmission circuit 23 generates AC power with a frequency (a transmission frequency) capable of propagating between the power transmission coil 21 and the power receiving coil 31. In general, to make it possible to transmit AC power, the power transmission coil 21 has a resonance frequency equal to the frequency of AC power. However, if it is allowed to transmit AC power, the resonance frequency of the power transmission coil 21 may be different from the frequency of the AC power. Similarly, to make it possible to transmit AC power, the power receiving coil 31 has a resonance frequency equal to the frequency of AC power. However, if it is allowed to transmit AC power, the resonance frequency of the power receiving coil 31 may be different from the frequency of the AC power.

Figure 3:
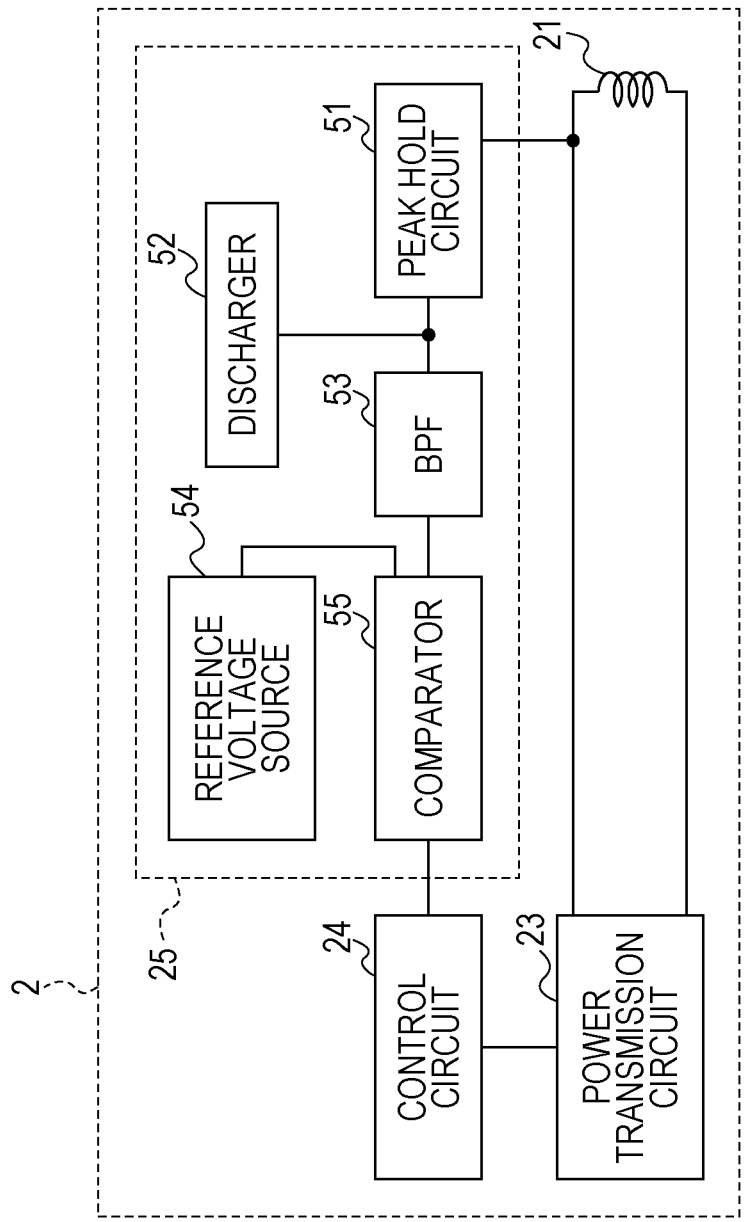
FIG. 3 is a block diagram illustrating a detailed configuration of an object detecting circuit in FIG. 2.

FIG. 3 is a block diagram illustrating a detailed configuration of the object detecting circuit 25 shown in FIG. 2. More specifically, FIG. 3 illustrates an example of the object detecting circuit 25 that detects a change in voltage of AC power in the power transmission coil 21. The object detecting circuit 25 includes a peak hold circuit 51, a discharger 52, a bandpass filter (BPF) 53, a reference voltage source 54, and a comparator 55. The peak hold circuit 51 and the discharger 52 detect an instant peak voltage of the AC power in the power transmission coil 21. The bandpass filter 53 removes a DC offset and an unnecessary frequency component from the detected peak voltage and output the resultant voltage to the comparator 55, The reference voltage source 54 inputs a predetermined threshold voltage to the comparator 55. The comparator 138 compares the voltage input from the bandpass filter 53 with the threshold voltage, and sends a signal indicating a comparison result to the control circuit 24. To enhance the detection accuracy, an amplifier (not illustrated) may be disposed between the bandpass filter 53 and the comparator 138. When the signal indicating the comparison result shows an occurrence of a change in voltage of AC power in the power transmission coil 21 (that is, when a metal object close to the coupling region is detected), the control circuit 24 stops supplying the AC power from the power transmission circuit 24 to the power transmission coil 21.

Next, referring to FIGS. 4 to 7, an operation of the wireless power transmission system shown in FIG. 1 is described below.

Figure 5:
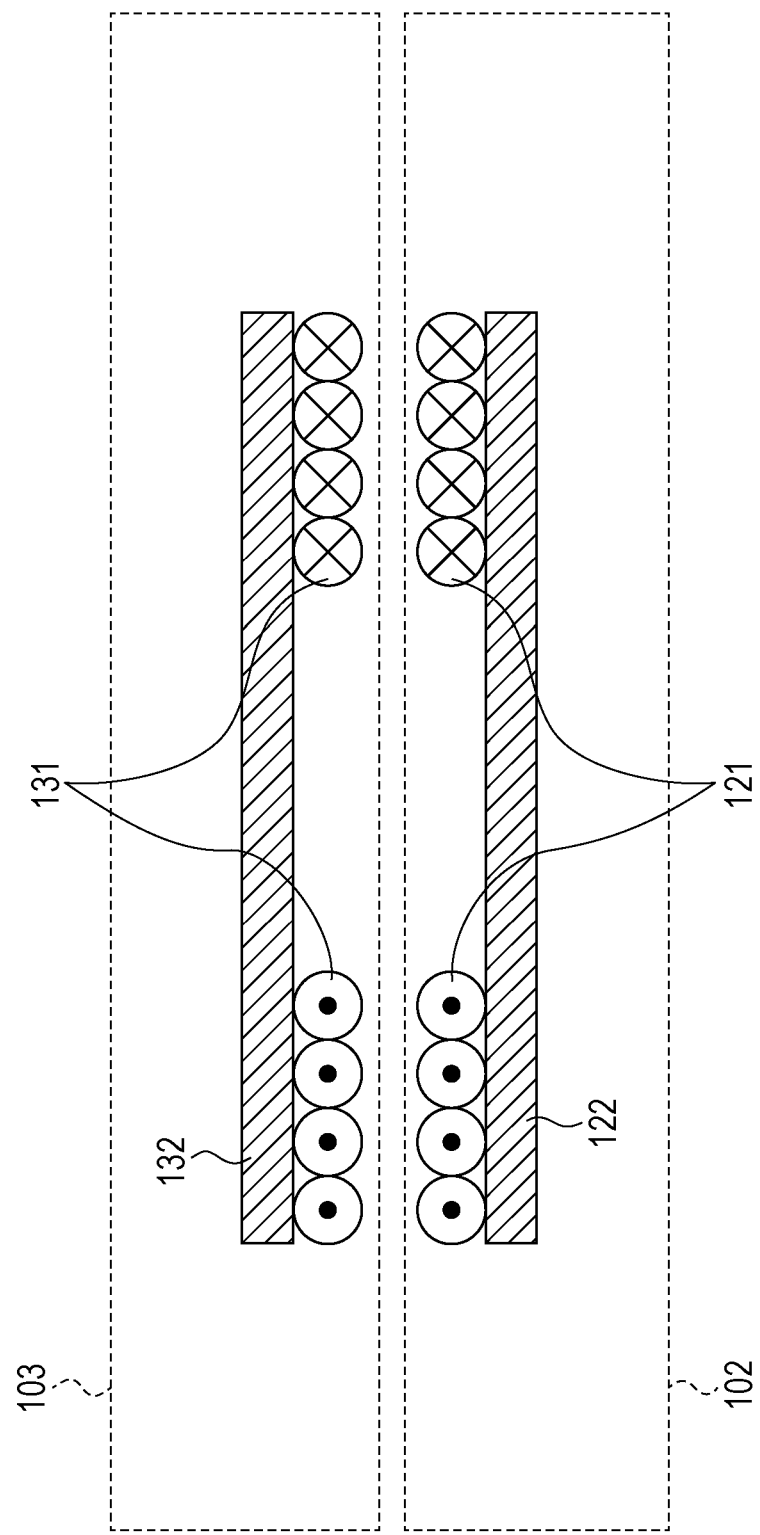
FIG. 5 is a cross-sectional view illustrating a structure of a wireless power transmission system according to a comparative example.

FIG. 5 is a cross-sectional view illustrating a structure of a wireless power transmission system according to a comparative example. The wireless power transmission system shown in FIG. 5 includes a power transmission device 102 and a power receiving device 103. The power transmission device 102 includes a power transmission coil 121 and a magnetic substance 122, and further includes the power transmission circuit 23, the control circuit 24, and the object detecting circuit 25, shown in FIG. 2 although not shown in FIG. 5. The power receiving device 103 includes a power receiving coil 131 and magnetic substance 132, and further includes the power receiving circuit 33 shown in FIG. 2 although not shown in FIG. 5. At least part of the winding of the power transmission coil 121 is wound along a surface, of the power transmission device 102, opposing the power receiving device 103. At least part of the winding of the power receiving coil 131 is wound along a surface, of the power receiving device 103, opposing the power transmission device 102.

In the wireless power transmission system, it is important to surely detect a metal object coming to a location close to only the power receiving coil while being apart from the power transmission coil. In particular, in a situation in which there is deviation in relative position between the power transmission coil and the power receiving coil, if it is possible to detect not only a metal object located close to the power transmission coil but also a metal object located close to only the power receiving coil but apart from the power transmission coil, then it is possible to more surely prevent metal objects from being heated, which allows a great enhancement of convenience for users.

Figure 6:
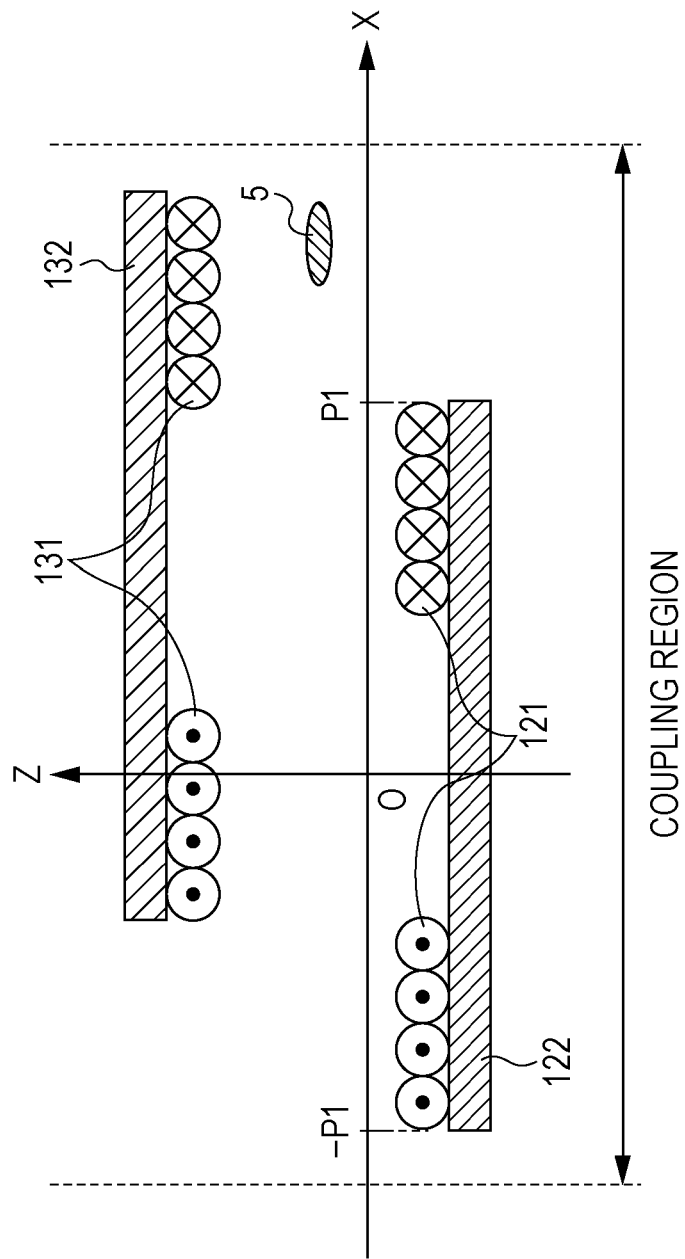
FIG. 6 is a cross-sectional view illustrating a situation in which there is some deviation in relative position between a power transmission coil and a power receiving coil in FIG. 5.

FIG. 6 is a cross-sectional view illustrating a situation in which there is some deviation in relative position between the power transmission coil 121 and the power receiving coil 131 in FIG. 5. There is a possibility that a metal object located close to the coupling region is electromagnetically coupled with at least one of the power transmission coil 121 and the power receiving coil 131, which may cause the metal object to be heated. In FIG. 6, the metal object 5 is located within the coupling region, and thus there is a possibility that when electric power is being transmitted from the power transmission device 102 to the power receiving device 103, the metal object 5 may be heated by an induced current caused by a magnetic field generated by the power receiving coil 132. However, in the wireless power transmission system shown in FIG. 5, it is difficult to detect the metal object 5 located close to only the power receiving coil 131 but apart from the power transmission coil 121 in a situation in which there is a deviation in relative position between the power transmission coil 121 and the power receiving coil 131.

Figure 7:
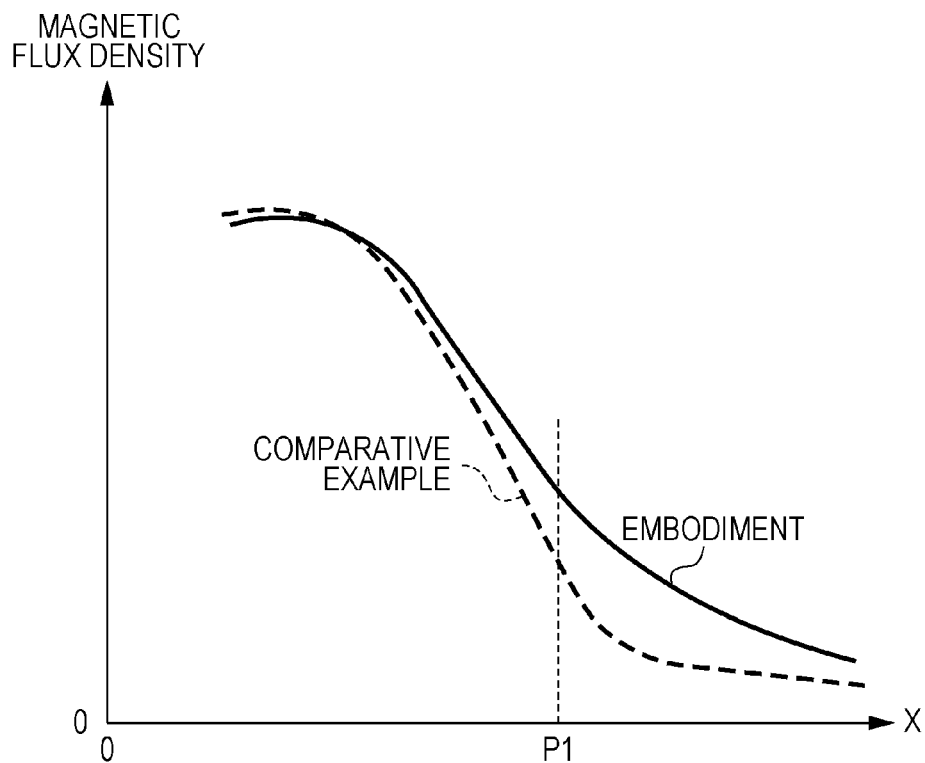
FIG. 7 is a graph illustrating a magnetic flux density generated by a power transmission coil in FIG. 1 and a magnetic flux density generated by a power transmission coil in FIG. 5.

In a graph shown in FIG. 7, a dotted line represents a magnetic flux density generated by the power transmission coil 121 shown in FIG. 5. In FIG. 7, a horizontal axis represents an X coordinate in FIG. 6 (and also in FIG. 4), and a vertical axis represents a magnetic flux density on a surface of the power transmission device 102. As illustrated in FIG. 7, the magnetic field generated by the power transmission coil 121 has an abrupt reduction in strength in a region outside the outer circumference (point P1) of the power transmission coil 121. Therefore, a current flowing through the power transmission coil 121 is not easily influenced by the metal object 5 located apart from the power transmission coil 121. Therefore, in the wireless power transmission system designed to be capable of detecting a metal object located close to the power transmission coil 121, it is very difficult to detect a metal object 5 located apart from the power transmission coil 121 by detecting a change in voltage or current associated with AC power in the power transmission coil 121.

FIG. 4 is a cross-sectional view illustrating a situation in which there is some deviation in relative position between the power transmission coil 21 and the power receiving coil 31 in FIG. 1. In the graph shown in FIG. 7, a solid line represents a magnetic flux density generated by the power transmission coil 21 in FIG. 1. In the power transmission device 2 shown in FIG. 1, the magnetic substance 22 is provided such that it is disposed along the coupling region to cover a region in which there is no winding of the power transmission coil 21 in the coupling region and such that magnetic substance 22 is electromagnetically coupled with the power transmission coil 21. This reduces the steepness of reduction in the magnetic flux density in the region outside the outer circumference (point P1) of the power transmission coil 21. Thus the power transmission device 2 is capable of detecting not only a metal object located close to the power transmission coil 21 but also a metal object 5 located close to only the power receiving coil 31 but apart from the power transmission coil 21 as long as the metal object is located close to the coupling region.

For example, the object detecting circuit 25 detects a metal object located close to the coupling region by detecting a change in at least one of a voltage, a current, and a frequency of AC power in the power transmission coil 21 in a state in which the power transmission device 2 is transmitting electric power to the power receiving device 3. If the control circuit 23 detects a object located close to the coupling region by using the object detecting circuit 25 in a situation in which the power transmission device 2 is transmitting electric power to the power receiving device 3, then the control circuit 23 stops supplying AC power from the power transmission circuit 24 to the power transmission coil 21. The voltage, the current, and the frequency of AC power in the power transmission coil 21 vary in various manners depending on conditions in terms of the resonance frequency of the respective power transmission coil 21 and the power receiving coil 31, the coupling condition between the power transmission coil 21 and the power receiving coil 31, electric power consumed by the load apparatus 4, etc.

Therefore, the object detecting circuit 25 measures in advance a change in at least one of a voltage, a current, and a frequency of AC power in the power transmission coil 21 in a situation in which a metal object is put close to the coupling region under various conditions, and the object detecting circuit 25 stores measured values in the form of a table (not shown). When the object detecting circuit 25 actually tries to detect a metal object, the object detecting circuit 25 compares the voltage, the current, or the frequency of AC power in the power transmission coil 21 with measured values stored in advance in the table to detect whether there is a change.

In a state in which no electric power is being transmitted from the power transmission device 2 to the power receiving device 3 (that is, for example, when the power receiving device 3 is not located opposite the power transmission device 2), the control circuit 23 may control the power transmission circuit 23 to intermittently transmit a test signal with a predetermined frequency to the power transmission coil 21. In this case, the object detecting circuit 25 detects a metal object located close to the coupling region by detecting a change in at least one of a voltage, a current, and a frequency of the test signal in the power transmission coil 21. When the control circuit 23 detects a metal object located close to the coupling region based on the test signal, the control circuit 23 does not supply AC power to the power transmission coil 21 from the power transmission circuit 23. Thus, for example, when the power receiving device 3 is not located opposite the power transmission device 2, the control circuit 23 performs a metal object detection operation using the test signal, and if the power receiving device 3 is placed opposite the power transmission device 2 thereafter, the control circuit 23 prevents electric power from being started to be transmitted from the power transmission device 2 to the power receiving device 3. The control circuit 23 continues to prevent electric power from being started to be transmitted from the power transmission device 2 to the power receiving device 3 until it is determined that there is no metal object close to the coupling region. The frequency of the test signal may be different from the frequency of the AC power to be transmitted. In this case, the frequency of the test signal may be set to maximize the Q value of the power transmission coil 21. This allows an increase in accuracy in detecting a metal object. In general, the frequency of the test signal is set to be higher than the frequency of the AC power. In this case, existence of a metal object results in an increase in voltage and also current of the AC power in the power transmission coil 21. Therefore, when the object detecting circuit 25 detects a voltage or a current higher than a predetermined threshold value, the object detecting circuit 25 determines that there is a metal object close to the coupling region.

Note that the magnetic substance 22 may be provided over a region that extends along a surface, of the power transmission device 2, opposing the power receiving device 3 and that is greater than the coupling region.

Figure 12:
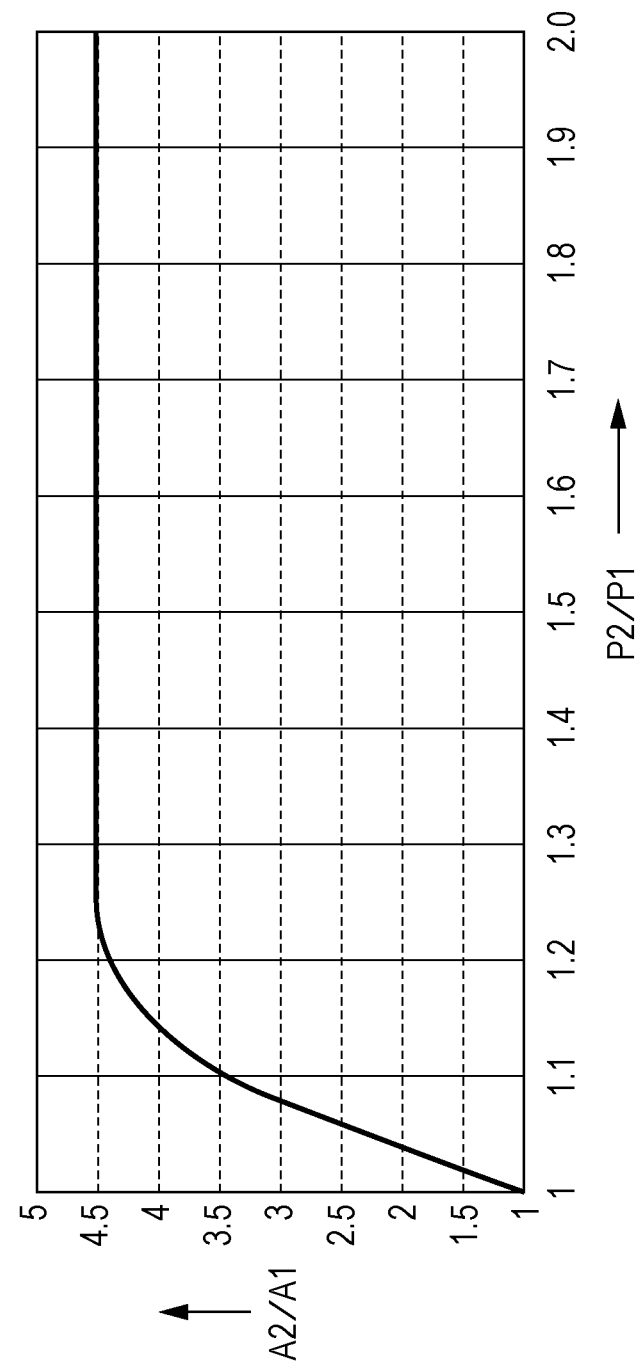
FIG. 12 is a graph illustrating a manner in which a region where it is possible to detect a metal object is expanded by a magnetic substance in FIG. 11.

Furthermore, the distance from the center of the winding of the power transmission coil wound in the coupling region (also referred to simply as the center of the power transmission coil) to the outer circumference of the magnetic substance 22 may be set to be in a range from 1.2 to 2, inclusive, times the distance from the center of the winding of the power transmission coil 21 to the outer circumference of the winding of the power transmission coil 21 (also referred to simply as the outer circumference of the power transmission coil), as will be described later with reference to, for example, FIG. 12.

The magnetic substance 22 may be disposed on a side opposite to the power receiving device 3 with respect to the surface including the winding of the power transmission coil 21 wound in the coupling region.

The magnetic substance 22 functions not only to ease the reduction in magnetic flux density outside the outer circumference of the power transmission coil 21 but also to shield the power transmission device 2. The magnetic substance 22 reduces degradation of characteristics of the power transmission coil 21 caused by a metal part and other parts disposed immediately below the power transmission coil 21 and also reduces an influence of the magnetic field generate by the power transmission coil 21 on the metal part and other parts disposed immediately below power transmission coil 21. To enhance the shielding, an additional metal plate (not illustrated) may be disposed below the magnetic substance 22. The provision of the metal plate makes it possible for the power transmission coil 21 to keep stable characteristics even in an environment in which metal is put below the power transmission device 2. Similarly, the magnetic substance 32 functions to shield the power receiving device 3.

Figure 8:
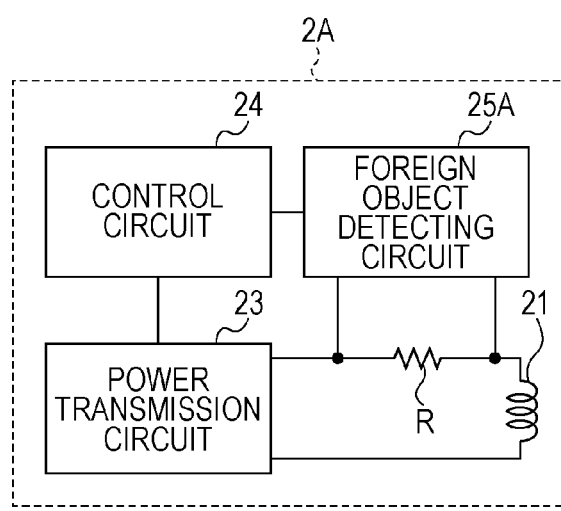
FIG. 8 is a block diagram illustrating a configuration of a power transmission device in a wireless power transmission system according to a second embodiment.

FIG. 8 is a block diagram illustrating a configuration of a power transmission device 2A in a wireless power transmission system according to a second embodiment. The power transmission device 2A shown in FIG. 8 includes a object detecting circuit 25A that detects a change in a current of AC power in the power transmission coil 21. A resistor R is connected in series to the power transmission coil 21 to detect a current flowing through the power transmission coil 21. The object detecting circuit 25A detects a metal object located close to the coupling region by detecting a change in a current of AC power in the power transmission coil 21.

Figure 9:
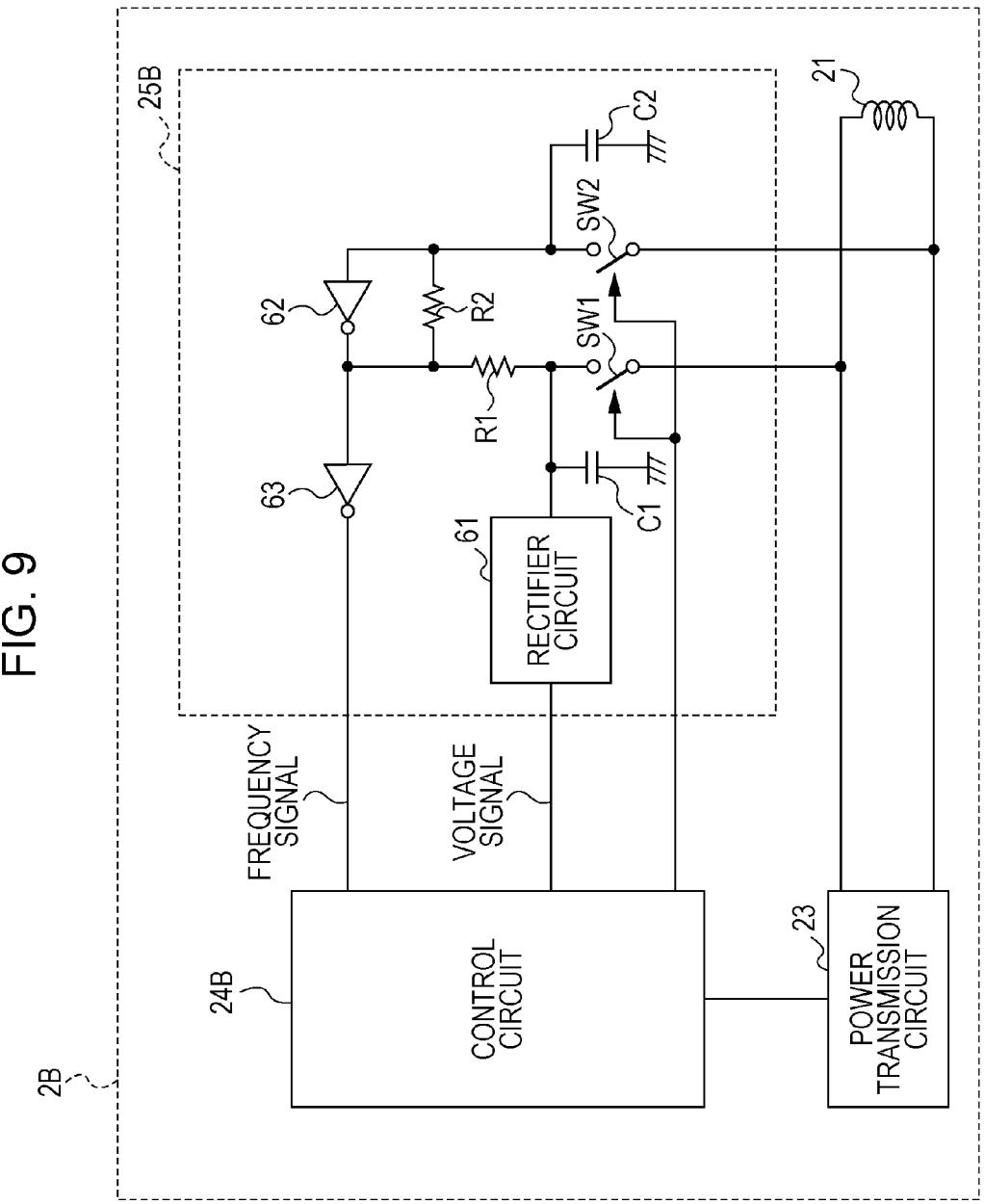
FIG. 9 is a block diagram illustrating a configuration of a power transmission device in a wireless power transmission system according to a third embodiment.

FIG. 9 is a block diagram illustrating a configuration of a power transmission device 2B in a wireless power transmission system according to a third embodiment. In the power transmission device 2B shown in FIG. 9, instead of the control circuit 24 and the object detecting circuit 25 shown in FIG. 2, a control circuit 24B and a object detecting circuit 25B are provided. The object detecting circuit 25B forms, together with the power transmission coil 21, an oscillation circuit, and detects a object located close to the coupling region by detecting a change in self-oscillation frequency of the oscillation circuit. Furthermore, the object detecting circuit 25B detects a metal object located close to the coupling region by detecting a change in voltage of AC power in the power transmission coil 21.

The object detecting circuit 25B includes switches SW1 and SW2, capacitors C2 and C2, resistors R1 and R2, a rectifier circuit 61, and logic inverters 62 and 63. A combination of the power transmission coil 21 and the object detecting circuit 25B forms an oscillation circuit such as a Pierce circuit having a self-oscillation frequency determined by the power transmission coil 21 and the capacitors C1 and C2, and having an oscillation condition determined by the resistors R1 and R2. When the control circuit 24B tries to detect a metal object, the control circuit 24B controls the power transmission circuit 23 to supply a test signal with a predetermined frequency to the power transmission coil 21. The switches SW1 and SW2 are closed under the control of the control circuit 24B only when a metal object detection is tried. The object detecting circuit 25B detects a change in voltage across the capacitor C1 and a change in self-oscillation frequency of the oscillation circuit, caused by existence of a metal object close to the coupling region. The voltage across the capacitor C1 is rectified by the rectifier circuit 61 and is sent, as a voltage signal, to the control circuit 24B. Use of the rectifier circuit 61 allows an improvement in accuracy in detecting a metal object. Use of a voltage doubler rectifier circuit as the rectifier circuit 61 allows a further improvement in accuracy in detecting a metal object. An amplifier (not shown) may be disposed in a stage following the rectifier circuit 61 to achieve a further improvement in accuracy in detecting a metal object. The control circuit 24B converts the voltage signal from analog to digital form. On the other hand, the logic inverters 62 and 63 are amplifying elements that generate the frequency signal with a frequency equal to the self-oscillation frequency of the oscillation circuit. The control circuit 24B detects a change in the self-oscillation frequency of the oscillation circuit by counting the frequency of the frequency signal output from the logic inverter 63. The object detecting circuit 25B is configured as a clock generator circuit using a Pierce circuit, and a clock signal with a rectangular wave is obtained as the frequency signal, which allows an improvement in the frequency counting accuracy. However, the oscillation circuit is not limited to the Pierce circuit, but one of common oscillation circuits such as a Hartley circuit, a Colpitts circuit, and the like may be used to generate a sinusoidal wave, and the generated sinusoidal wave may be converted to a rectangular wave.

Parameters may be set, for example, such that the resistor R1 has a resistance of 1.1 kΩ, the resistor R2 has a resistance of 2.2 MΩ, the capacitors C1 and C2 each have a capacitance of 20 nF, the test signal has a frequency of 300 kHz. In general, the frequency of the test signal is set to be higher than the frequency of electric power transmitted. By setting the frequency of the test signal to be higher than the frequency of second AC power, it is possible to enhance the time resolution in detecting a object. This results in an increase in the metal object detection accuracy.

In the oscillation circuit formed using the power transmission coil 21 and the object detecting circuit 25B, the voltage, the current, and the frequency of the oscillation circuit change greatly in response to a change in inductance or resistance of the power transmission coil 21 that occurs when a metal object is put at a location close to the coupling region. Thus an increase in the sensitivity of detecting a metal object is achieved.

Figure 10:
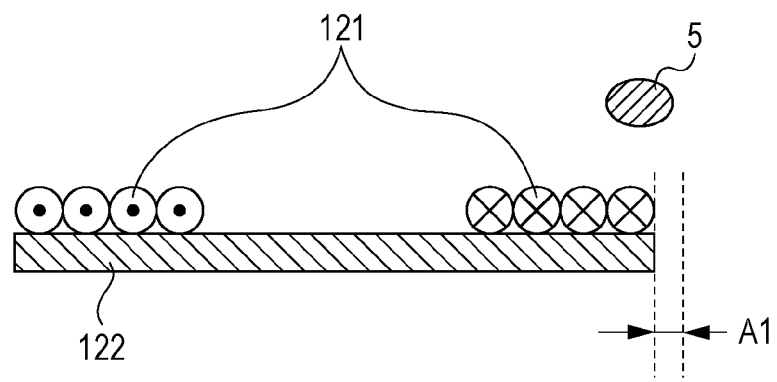
FIG. 10 is a cross-sectional view illustrating a region where it is possible to detect a metal object outside an outer circumference of a power transmission coil in FIG. 5.
Figure 11:
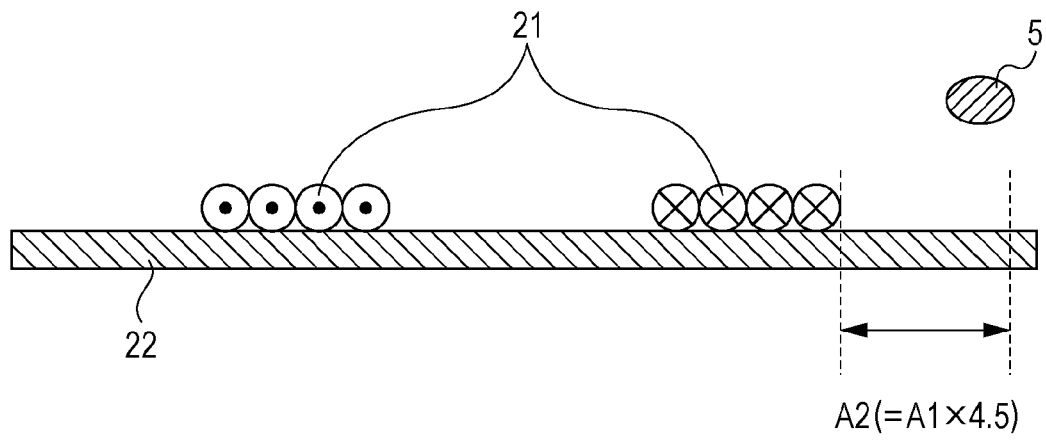
FIG. 11 is a cross-sectional view illustrating a region where it is possible to detect a metal object outside an outer circumference of a power transmission coil in FIG. 9.

FIG. 10 is a cross-sectional view illustrating a region A1 where it is possible to detect a metal object 5 outside the outer circumference of the power transmission coil 121 shown in FIG. 5. FIG. 11 is a cross-sectional view illustrating a region A2 where it is possible to detect a metal object 5 outside the outer circumference the power transmission coil 21 shown in FIG. 9. The power transmission coils 21 and 121 each have a radius of 19.5 mm at their outer circumference. The metal object 5 is iron with a diameter of 5 mm and a thickness of 1 mm. In both FIG. 10 and FIG. 11, the power transmission coils 21 and 121 are each connected to the same object detecting circuit 25, and the object detecting circuit 25 detects the metal object 5 by detecting a change in at least one of the voltage, the current, and the frequency of the AC power in the power transmission coil 21 or 121 with reference to the same threshold value. In FIG. 10, it is possible to detect the metal object 5 even when the metal object 5 is located outside the outer circumference of the power transmission coil 121 as long as the metal object 5 is within the region (the region A1) in which the metal object 5 is electromagnetically coupled with the power transmission coil 121. On the other hand, in FIG. 11, the magnetic substance 22 is provided to extend along the coupling region such that a region in which the winding of the power transmission coil 21 is not wound in the coupling region is also covered with the magnetic substance 22, and thus it is possible to detect the metal object 5 over a greater region (region A2=A1×4.5), FIG. 12 is a graph illustrating a manner in which a region where it is possible to detect the metal object 5 is expanded by the magnetic substance 22 shown in FIG. 11. In FIG. 12, a horizontal axis represents the ratio of the distance from the center O of the winding of the power transmission coil 21 to the outer circumference P2 of the magnetic substance 22 with reference to the distance from the center O of the winding of the power transmission coil 21 wound within the coupling region to the outer circumference P1 of the winding of the power transmission coil 21 (see FIG. 4 (hereinafter, this ratio will be referred to as P2/P1)). In FIG. 12, a vertical axis represents the ratio of the region A2 in which it is possible to detect the metal object 5 coupled with the power transmission coil 21 shown in FIG. 12 with reference to the region A2 in which it is possible to detect the metal object 5 coupled with the power transmission coil 121 shown in FIG. 10. In FIG. 12, in the range of P2/P1 from 1 to 1.2, the region A2, in which the metal object 5 is detectable, increases linearly with P2/P1. However, when P2/P1 is equal to or greater than 1.2, the increase in region A2 is saturated. By using the magnetic substance 22 having a size 1.2 or more times greater than the size of the power transmission coil 21, it becomes possible to reduce an influence of production variation on the detection level. Taking the cost of the material of the magnetic substance 22 into account, the size of the magnetic substance 22 may be set to be equal to or smaller than 2 times the size of power transmission coil 21. Now a description is given here as to a method of measuring P1 and P2 for a case where the power transmission coil and the magnetic substance are not similar in shape. First, a segment is determined that extends along the shortest distance from the center of the power transmission coil to the outer circumference of the magnetic substance. Then P2 is given by the distance from the center of the power transmission coil to the point at which the above-described segment intersects with the outer circumference of the magnetic substance, and P1 is given by the distance from the center of the power transmission coil to the point at which the above-described segment intersects with the outer circumference of the power transmission coil.

Figure 13:
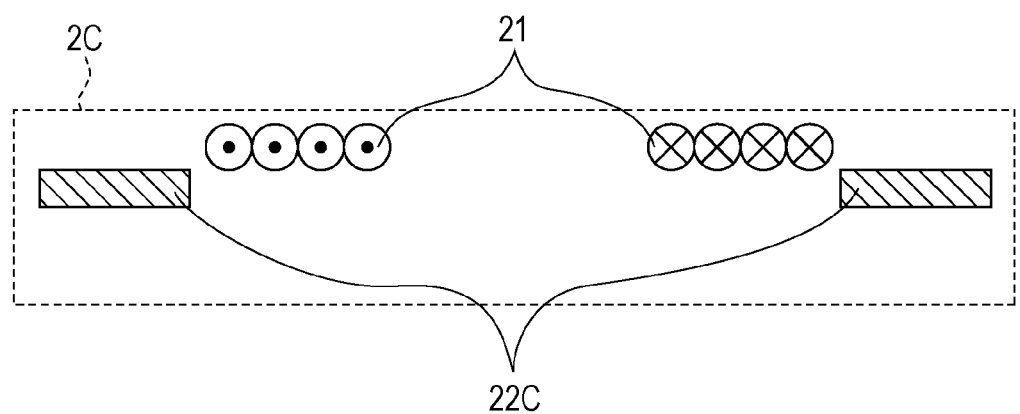
FIG. 13 is a cross-sectional view illustrating a structure of a power transmission device in a wireless power transmission system according to a fourth embodiment.
Figure 14:
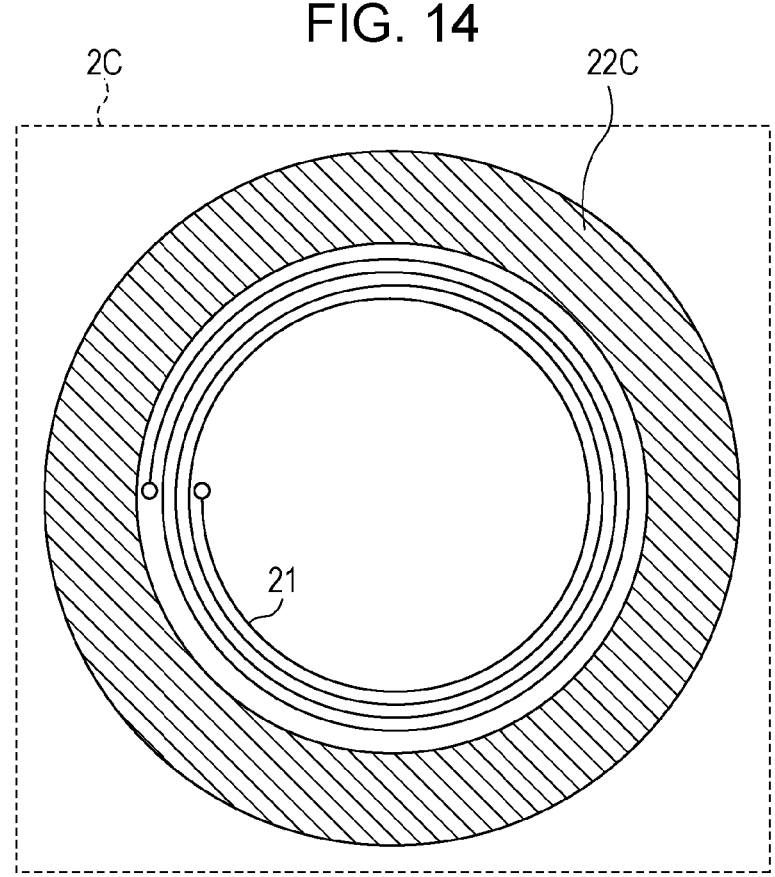
FIG. 14 is a top view illustrating a structure of a power transmission device in FIG. 13.

FIG. 13 is a cross-sectional view illustrating a structure of a power transmission device 2C in a wireless power transmission system according to a fourth embodiment. FIG. 14 is a top view illustrating the structure of the power transmission device 2C shown in FIG. 13. Within a range in which electromagnetic coupling with the power transmission coil 21 is possible, a magnetic substance may not be provided even in a region in which the winding of the power transmission coil 21 is not wound in the coupling region. In the power transmission device 2C illustrated in FIG. 13 and FIG. 14, a magnetic substance 22C with a ring shape is provided to cover a region outside the outer circumference of the winding of the power transmission coil 21, but no magnetic substance is provided inside the outer circumference of the winding of the power transmission coil 21. Alternatively, the magnetic substance may be provided to cover also a region inside the inner circumference of the winding of the power transmission coil 21. The power transmission device 2C shown in FIG. 13 and FIG. 14 results in a reduction in the material of the magnetic substance, which allows a reduction in weight and cost of the power transmission device 2.

Figure 15:
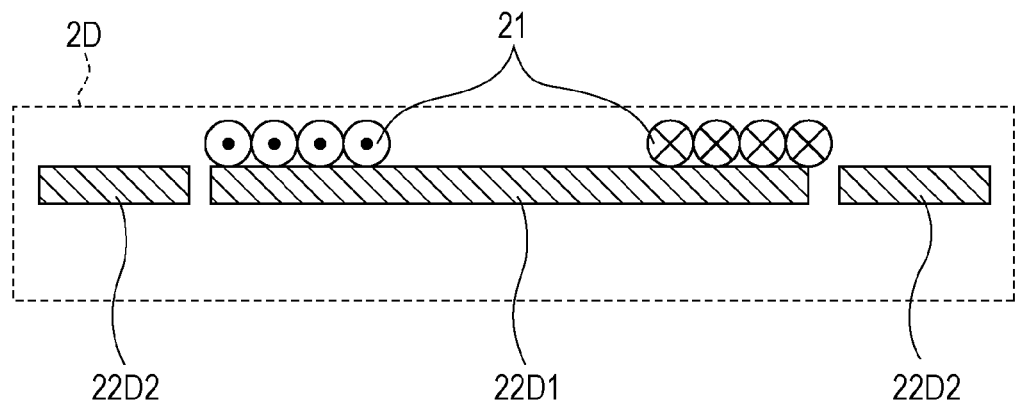
FIG. 15 is a cross-sectional view illustrating a structure of a power transmission device in a wireless power transmission system according to a fifth embodiment.
Figure 16:
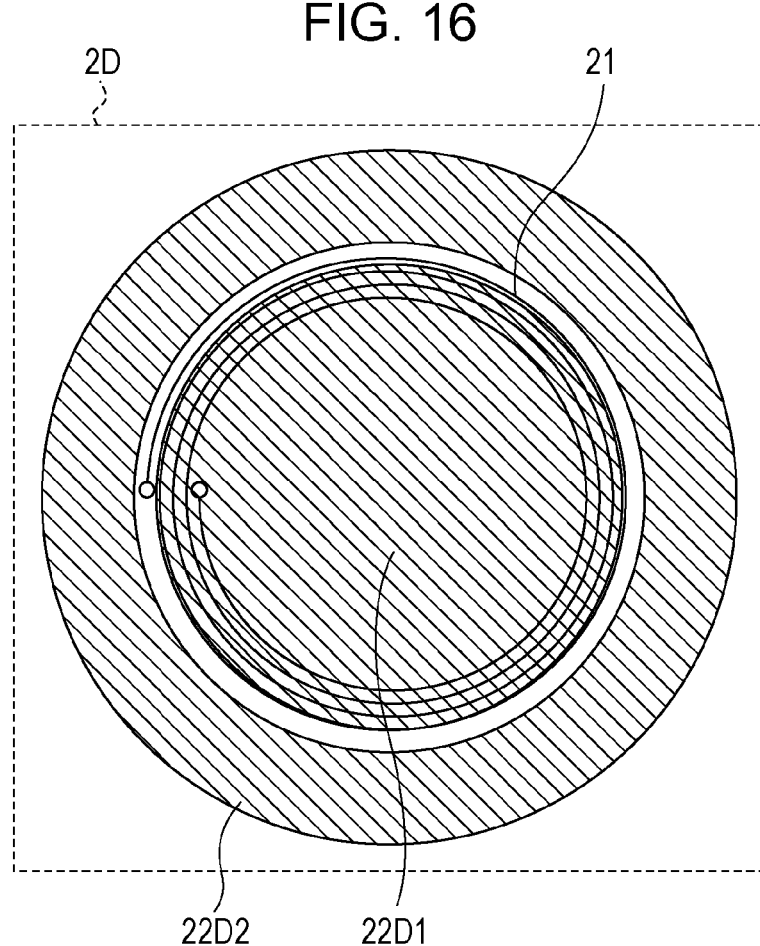
FIG. 16 is a top view illustrating a structure of the power transmission device in FIG. 15.

FIG. 15 is a cross-sectional view illustrating a structure of a power transmission device 20 in a wireless power transmission system according to a fifth embodiment. FIG. 16 is a top view illustrating a structure of the power transmission device 2D shown in FIG. 15. In the power transmission device 2D shown in FIG. 15 and FIG. 16, a magnetic substance 22D1 is provided to cover a region inside the outer circumference of the winding of the power transmission coil 21, and a magnetic substance 22D2 with a ring shape is provided to cover a region outside the outer circumference of the winding of the power transmission coil 21. The power transmission device 2C shown in FIG. 13 and FIG. 14 allows an improvement in the degree of freedom in terms of the structure. Furthermore, when a magnetic field is generated by the power transmission coil a part of the magnetic field on the side of the magnetic substance can be absorbed by the part of the magnetic substance located inside the outer circumference of the power transmission coil. Thus it is possible to prevent an electromagnetic wave from leaking from the power transmission device to the side of the magnetic substance. As a result, an adverse effect of the electromagnetic wave on other parts is prevented. Note that this is also true for the power transmission device shown in FIG. 1.

Figure 17:
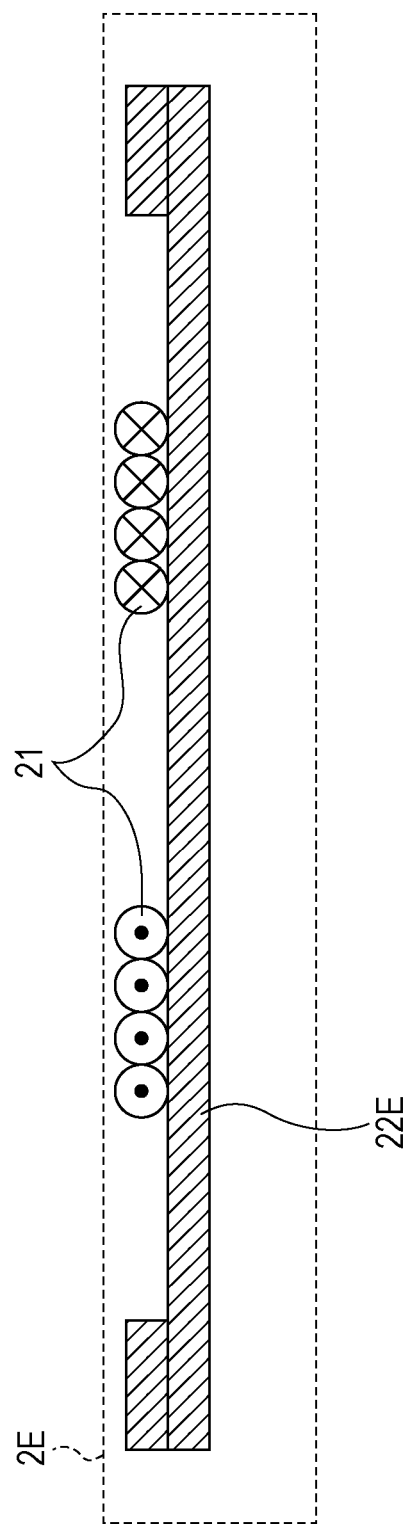
FIG. 17 is a cross-sectional view illustrating a structure of a power transmission device in a wireless power transmission system according to a sixth embodiment.

FIG. 17 is a cross-sectional view illustrating a structure of a power transmission device 2E in a wireless power transmission system according to a sixth embodiment. The power transmission device 2E includes a magnetic substance 22E including a protrusion protruding in a direction toward a power receiving device (not shown in FIG. 17) installed close to the upper surface of the power transmission device 2E. In the power transmission device 2E shown in FIG. 17, a further suppression is achieved in terms of reduction in magnetic flux density outside the outer circumference of the winding of the power transmission coil, and thus it becomes possible to further expand the range in which it is possible to detect a metal object. This makes it possible for the power transmission device 2E shown in FIG. 17 to detect a metal object located away upward from the power transmission coil 21 or a metal object with a small size.

Figure 18:
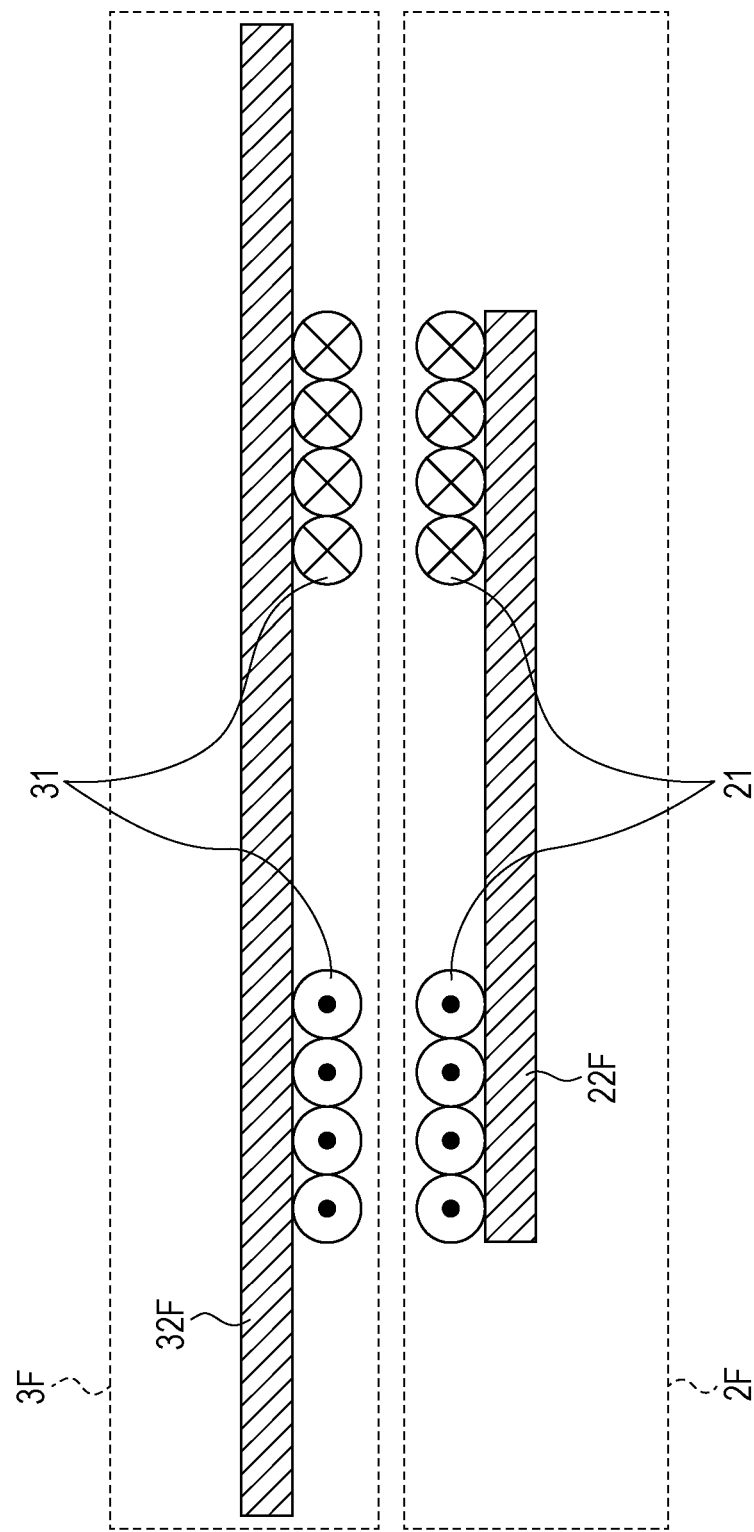
FIG. 18 is a cross-sectional view illustrating a structure of a wireless power transmission system according to a seventh embodiment.

FIG. 18 is a cross-sectional view illustrating a structure of a wireless power transmission system according to a seventh embodiment. The power transmission device 2F includes a power transmission coil 21 and a magnetic substance 22F, and the power receiving device 3F includes a power receiving coil 31 and a magnetic substance 32F. At least part of the winding of the power receiving coil 31 is wound within a "coupling region" which is a region on a surface, opposing the power transmission device 2F, of the power receiving device 3F such that the power receiving coil 31 comes close to the power transmission coil 21 when electric power is transmitted from the power transmission coil 21 to the power receiving coil 31 in a state in which the power transmission coil 21 and the power receiving coil 31 are electromagnetically coupled with each other. The magnetic substance 32F is disposed over the coupling region to cover a region, in the coupling region, in which the winding of the power transmission coil 21 is not wound, and to be electromagnetically coupled with the power receiving coil 31.

Figure 19:
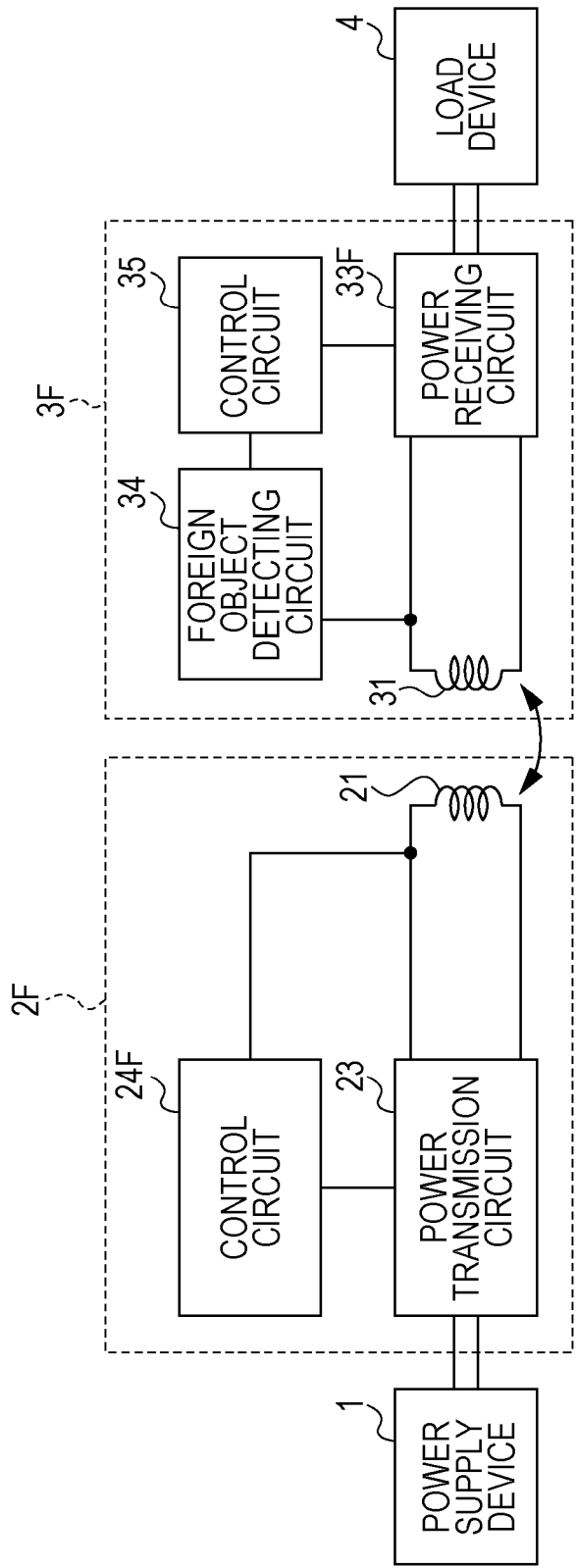
FIG. 19 is a block diagram illustrating a configuration of a wireless power transmission system in FIG. 18.

FIG. 19 is a block diagram illustrating a configuration of the wireless power transmission system shown in FIG. 18. The power transmission device 2F further includes a power transmission circuit 23 and a control circuit 24F. The power receiving device 3F further includes a power receiving circuit 33, a object detecting circuit 34, and a control circuit 35. The object detecting circuit 34 detects a metal object located close to the coupling region by detecting a change in at least one of a voltage, a current, and a frequency of AC power in the power transmission coil 21. When the object detecting circuit 34 detects a object located close to the coupling region, the control circuit 35 of the power receiving device 3F sends a control signal to the power transmission device 2F via the power receiving circuit 33F and the power receiving coil 31 to stop the transmission of electric power from the power transmission device 2F to the power receiving device 3F. If the control circuit 24F of the power transmission device 2F receives the control signal from the power receiving device 3F via the power transmission coil 21, the control circuit 24F stops supplying AC power from the power transmission circuit 24 to the power transmission coil 21.

As described above with reference to FIG. 18 and FIG. 19, a metal object close to the coupling region may be detected by the power receiving device 3F.

Modifications

In the embodiments, the power transmission coil and the magnetic substance are formed in the shape of, for example, a circle. However, the shape is not limited to the circle, but any other shape such as an ellipse, a square, a rectangle, or the like may be used. The power transmission coil may be wound in a spiral form or in a solenoidal form.

For example, the coupling region may be the whole surface, opposing the power receiving device, of the power transmission device. Alternatively, the coupling region may be a region extending into another region depending on the shapes of housings of the power transmission device and the power receiving device.

In the case where the power transmission device includes the object detection device, the power receiving device may be of a general type. Even when the power receiving device is of a general type, it is possible to detect a metal object close to the coupling region, which ensures that heating of the metal object is prevented.

Note that the embodiments disclosed above are merely illustrative examples and are not meant to limit the scope of the disclosure. The scope of the present disclosure is not limited by the embodiments described above but is limited only by the appended claims. Note that various equivalent embodiments and modifications are possible without departing from the spirit and the scope of the invention.

Power Transmission Device According to a First Aspect of the Present Disclosure

In the first aspect of the present disclosure, a power transmission device wirelessly transmits electric power to a power receiving device including a power receiving coil, and the power transmission device includes: a power transmission coil that is disposed to oppose an installation surface of the power transmission device on which the power receiving device is installed and that is capable of being electromagnetically coupled with the power receiving coil; a magnetic substance that is disposed at least outside the power transmission coil to oppose the installation surface via the power transmission coil and that is electromagnetically coupled with the power transmission coil; and a object detecting circuit that detects a metal object existing at least outside the power transmission coil by supplying first AC power to the power transmission coil and detecting a change in at least one of a voltage of the first AC power, a current of the first AC power, a frequency of the first AC power, a voltage of a DC component of the first AC power, and a current of the DC component of the first AC power.

In this aspect, the magnetic substance may be disposed at least outside the power transmission coil. This allows it to expand the magnetic field generated between the magnetic substance and the power transmission coil into a region outside the power transmission coil. Thus it becomes possible to detect a change in magnetic field outside the power transmission coil. Therefore, even in a situation in which the power receiving coil and the power transmission coil are electromagnetically coupled although there is a deviation in relative position between the power receiving coil and the power transmission coil, it is possible to detect not only a metal object located close to the power transmission coil but also a metal object located close to only the power receiving coil but located apart from the power transmission coil.

The object detecting circuit may supply first AC power to the power transmission coil. This makes it possible to perform the metal object detection, not during a period in which electric power is supplied to the power receiving device, but before the supplying of the electric power to the power receiving device is started. Thus heating of the metal object is prevented.

In the aspect described above, the object detecting circuit may detect a metal object in a region of the magnetic substance disposed at least outside the power transmission coil.

Herein, the region of the magnetic substance is defined as follows. That is, the region of the magnetic substance is a region in which a metal object may exist at a location close to only the power receiving coil but apart from the power transmission coil. In the example shown in FIG. 4, the region of the magnetic substance is defined by a region extending in a Z direction and including a magnetic substance between P1 and P2, and a region extending in the Z direction and including a magnetic substance between −P1 and −P2.

In the present aspect, the magnetic substance may be disposed also inside the outer circumference of the power transmission coil.

In this aspect, when a magnetic field is generated by the power transmission coil, a part of the magnetic field on the side of the magnetic substance can be absorbed by the part of the magnetic substance located inside the outer circumference of the power transmission coil. Thus it is possible to prevent an electromagnetic wave from leaking from the power transmission device to a region on the side of the magnetic substance. As a result, an adverse effect of the electromagnetic wave on other parts is prevented.

In the aspect described above, a power transmission circuit may be provided that supplies second AC power greater than the first AC power supplied by the object detecting circuit, and in a case where the object detecting circuit does not detect the metal object in a state in which the power receiving device is installed on the installation surface of the power transmission device, then the power transmission circuit may supply the second AC power to the power transmission coil.

In this aspect, the object detecting circuit supplies first AC power smaller, that is, weaker than the second AC power to the power transmission coil. This makes it possible for the object detecting circuit to detect a metal object by using the weak first AC power, not during the period in which the second AC power is supplied, but before starting supplying the second AC power. Thus, even if there is a metal object, it is possible to prevent an eddy current from occurring in the metal object and thus it is possible to prevent the metal object from being heated.

In a case where the result of the object detection process indicates that no metal object is detected at least outside the power transmission coil, the power transmission circuit supplies second AC power to the power transmission coil. Thus safety is ensured when the second AC power is supplied to the power transmission coil.

In the aspect described above, the distance from the center of the power transmission coil to the outer circumference of the magnetic substance may be in a range from 1.2 to 2, inclusive, times the distance from the center of the power transmission coil to the outer circumference of the power transmission coil.

In this aspect, it is possible to generate a magnetic field in a stable manner even when there is a variation in size of the magnetic substance.

In the aspect described above, the magnetic substance may include a protrusion located on the outer circumference part of the magnetic substance and protruding in a direction toward the installation surface.

In this aspect, the provision of the protrusion protruding in the direction toward the installation surface prevents dispersion of the magnetic field generated by the power transmission coil. This results in an increase in magnetic flux density in a region outside the outer circumference of the power transmission coil. Thus it becomes possible to detect even a metal object located apart in a vertical direction from the installation surface of the power transmission device.

In the aspect described above, the object detecting circuit may form, together with the power transmission coil, an oscillation circuit that oscillates at a frequency higher than the frequency of the second AC power and generates the first AC power.

In this aspect, use of the frequency higher than the frequency of the second AC power makes it possible to enhance the time resolution in detecting a object, which results in an increase in the metal object detection accuracy.

The aspect described above may also be realized in a wireless power transmission system.

Power Transmission Device According to a Second Aspect of the Present Disclosure In the second aspect of the present disclosure, a power transmission device wirelessly transmits electric power to a power receiving device including a power receiving coil, and the power transmission device includes: a power transmission coil that is disposed to oppose an installation surface of the power transmission device on which the power receiving device is installed and that is capable of being electromagnetically coupled with the power receiving coil; a magnetic substance that is disposed at least outside the power transmission coil to oppose the installation surface via the power transmission coil and that is electromagnetically coupled with the power transmission coil; a power transmission circuit that supplies AC power to the power transmission coil; and a object detecting circuit that detects a metal object existing at least outside the power transmission coil detecting a change in at least one of a voltage, a current, and a frequency of the AC power and a voltage or a current of a DC component of the first AC power.

In the aspect described above, the magnetic substance is disposed at least outside the power transmission coil. This allows it to expand the magnetic field generated between the magnetic substance and the power transmission coil into a region outside the power transmission coil. Thus it becomes possible to detect a change in magnetic field outside the power transmission coil. Therefore, even in a situation in which the power receiving coil and the power transmission coil are electromagnetically coupled although there is a deviation in relative position between the power receiving coil and the power transmission coil, it is possible to detect not only a metal object located close to the power transmission coil but also a metal object located close to only the power receiving coil but located apart from the power transmission coil.

The object detecting circuit detects a object by using the AC power supplied from the power transmission circuit to the power transmission coil. In this case, the metal object detection is performed during a period in which electric power is supplied to the power receiving device. Thus, when a metal object is detected when electric power is being transmitted to the power receiving device, heating of the metal object is prevented.

The aspect described above may also be realized in a wireless power transmission system.

Power Transmission Device According to a Third Aspect of the Present Disclosure

In the third aspect of the present disclosure, a power transmission device wirelessly transmits electric power to a power receiving device including a power receiving coil, and the power transmission device includes: a power transmission coil capable of being electromagnetically coupled with the power receiving coil, wherein at least part of the winding of the power transmission coil is wound within a coupling region which is a region on a surface, opposing the power receiving device, of the power transmission device such that the power receiving coil comes close to the coupling region when electric power is transmitted from the power transmission coil to the power receiving coil in a state in which the power transmission coil and the power receiving coil are electromagnetically coupled with each other, and wherein the power transmission device further includes: a magnetic substance provided to extend over the coupling region to cover a region in which the winding of the power transmission coil 21 is not wound in the coupling region; a power transmission circuit that supplies AC power to the power transmission coil; a object detecting circuit that detects a object located close to the coupling region by detecting a change in at least one of a voltage, a current, and a frequency of AC power in the power transmission coil; and a control circuit that operates such that when a object located close to the coupling region is detected by the object detecting circuit, the control circuit stops supplying AC power from the power transmission circuit to the power transmission coil.

In the aspect described above, the magnetic substance may be disposed over a region greater than the coupling region such that the magnetic substance extends in parallel with a surface, of the power transmission device, opposing the power receiving device.

In the aspect described above, the distance from the center of the winding of the power transmission coil wound within the coupling region to the outer circumference of the magnetic substance may be in a range from 1.2 to 2, inclusive, times the distance from the center of the winding of the power transmission coil to the outer circumference of the winding of the power transmission coil.

In the aspect described above, the magnetic substance may be disposed on a side opposite to the power receiving device with respect to the surface including the winding of the power transmission coil wound in the coupling region.

In the aspect described above, the magnetic substance may include a protrusion protruding in a direction toward the power receiving device.

In the aspect described above, the object detecting circuit may detect a object located close to the coupling region by detecting a change in at least one of a voltage, a current, and a frequency of AC power in the power transmission coil in a state in which the power transmission device is transmitting electric power to the power receiving device.

In the aspect described above, the control circuit may control the power transmission circuit to transmit a test signal with a predetermined frequency to the power transmission coil when no electric power is being transmitted from the power transmission device to the power receiving device, the object detecting circuit may detect a object located close to the coupling region by detecting a change in at least one of a voltage, a current, and a frequency of the test signal in the power transmission coil, and when the control circuit detects a object located close to the coupling region based on the test signal, the control circuit may control the power transmission circuit to not supply the AC power from the power transmission circuit to the power transmission coil.

In the aspect described above, the object detecting circuit may form, together with the power transmission coil, an oscillation circuit and may detect a object located close to the coupling region by detecting a change in self-oscillation frequency of the oscillation circuit.

The aspect described above may also be realized in a wireless power transmission system.

The power transmission device and the wireless power transmission system disclosed herein are useful in surely detecting a metal object located close to a power transmission coil or a power receiving coil when electric power is transmitted wirelessly to a mobile device, an EV vehicle, or the like.

What is claimed is:

1. A power transmission device that wirelessly transmits electric power to a power receiving device including a power receiving coil, comprising:
    a power transmission coil that is disposed to oppose an installation surface of the power transmission device on which the power receiving device is installed and that is capable of being electromagnetically coupled with the power receiving coil;
    a magnetic substance that is disposed at least outside the power transmission coil to oppose the installation surface via the power transmission coil and that is electromagnetically coupled with the power transmission coil; and
    an object detecting circuit that detects a metal object existing in the at least outside the power transmission coil by supplying first AC power to the power transmission coil and detecting a change in at least one of a voltage of the first AC power, a current of the first AC power, a frequency of the first AC power, a voltage of a DC component of the first AC power, and a current of the DC component of the first AC power,
    wherein the magnetic substance includes a protrusion that is located on an outer circumference part of the magnetic substance that protrudes to oppose the installation surface and protrudes in a direction toward the power receiving device, and wherein there is a space between the protrusion and the power transmission coil.

2. The power transmission device according to claim 1, wherein the object detecting circuit detects the metal object in a region of the magnetic substance disposed at least outside the power transmission coil.

3. The power transmission device according to claim 1, wherein the magnetic substance is disposed also inside an outer circumference of the power transmission coil.

4. The power transmission device according to claim 1, further comprising a power transmission circuit that supplies second AC power greater than the first AC power supplied by the object detecting circuit,
    wherein in a case where the object detecting circuit does not detect the metal object in a state in which the power receiving device is installed on the installation surface of the power transmission device, then the power transmission circuit supplies the second AC power to the power transmission coil.

5. The power transmission device according to claim 4, wherein the object detecting circuit forms, together with the power transmission coil, an oscillation circuit that oscillates at a frequency higher than a frequency of the second AC power and generates the first AC power.

6. The power transmission device according to claim 1, wherein a distance from a center of the power transmission coil to the outer circumference of the magnetic substance is in a range from 1.2 to 2, inclusive, times the distance from the center of the power transmission coil to the outer circumference of the power transmission coil.

7. A wireless power transmission system comprising:
a power transmission device; and
a power receiving device including a power receiving coil, wherein the power transmission device that wirelessly transmits electric power to a power receiving device including a power receiving coil, comprising:
a power transmission coil that is disposed to oppose an installation surface of the power transmission device on which the power receiving device is installed and that is capable of being electromagnetically coupled with the power receiving coil;
a magnetic substance that is disposed at least outside the power transmission coil to oppose the installation surface via the power transmission coil and that is electromagnetically coupled with the power transmission coil; and
an object detecting circuit that detects a metal object existing in the at least outside the power transmission coil by supplying first AC power to the power transmission coil and detecting a change in at least one of a voltage of the first AC power, a current of the first AC power, a frequency of the first AC power, a voltage of a DC component of the first AC power, and a current of the DC component of the first AC power,
wherein the magnetic substance includes a protrusion that is located on an outer circumference part of the magnetic substance that protrudes to oppose the installation surface and protrudes in a direction toward the power receiving device, and wherein there is a space between the protrusion and the power transmission coil.

* * * * *